Patented June 15, 1954

2,681,353

UNITED STATES PATENT OFFICE 2,681,353

CHLORINATION OF KETO-STEROIDS

Sydney Archer, Albany, N. Y., assignor to Sterling Drug Inc., New York, N. Y., a corporation of Delaware No Drawing. Application March 11, 1952, Serial No. 276,063

6 Claims. (Cl. 260—397.4)

This invention relates to a new method for chlorination of a keto-steroid in a position alpha to the keto group which comprises treating said keto-steroid in an inert organic solvent with at least one equivalent of an aryliodine dichloride.

The process of the invention is useful in preparing intermediates valuable in the synthesis of adrenal cortical and other steroidal hormones.

The chemical reaction can be represented generally as follows:

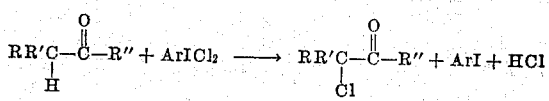

In the above equation RR'CHCOR" represents a steroid molecule and Ar represents an aryl radical. The keto group can be in the steroid nucleus or in a side chain attached to the steroid nucleus.

It is well-known that halogenation of keto-steroids takes place with varying degrees of difficulty depending upon the position of the keto group in the molecule. For example, a 3-keto-steroid of the normal series halogenates very readily in the 4-position, a 20-keto-steroid halogenates slightly less readily in the 17- or 21-positions, and an 11-keto-steroid halogenates much less readily in the 12-position. These differences in reactivity are due to steric factors.

The aryliodine dichlorides possess a distinct advantage over halogenating agents heretofore used in that a more selective chlorination is possible when more than one point of attack is present in the steroid molecule. When aryliodine dichlorides are used, the difference in the reactivity of the positions alpha to keto groups in different parts of the steroid molecule appears to be magnified, possibly due to the relatively large size of the reagent molecule. For example, in the halogenation of pregnane-3α,17α-diol-11,20-dione with halogenating agents such as chlorine, bromine or sulfuryl chloride it is not possible to effect complete halogenation of the 21-position without causing halogenation elsewhere in the molecule to a greater or lesser extent, presumably in the 12-position. With phenyliodine dichloride, however, it has been found possible to chlorinate pregnane-3α,17α-diol-11,20-dione exclusively in the 21-position in nearly quantitative yields by proper regulation of conditions and the relative amounts of reactants.

Any steroid having hydrogen in a position alpha to a keto group can be used as the starting material in this new process. The optimum conditions for carrying out the reaction depend upon the point of attack in the steroid molecule. If the alpha hydrogen is in a sterically hindered position, more drastic conditions will be necessary than if it is in a position readily approached by the reagent molecule. For example, pregnane-3,11,20-trione can be chlorinated readily in the 4-, 17- and 21-positions by mixing the steroid and phenyliodine dichloride in an inert solvent at room temperature. Positions 2, 9 and 12 are also available for chlorination but are less reactive due to steric hindrance and other factors, and moderate heating with excess aryliodine dichloride may be required in order for chlorination to take place in these positions.

The invention is most conveniently applied to steroids which are completely saturated in the nucleus. If an ethylenically unsaturated keto-steroid is used as the starting material mixtures may be formed due to the addition of chlorine to double bonds. This disadvantage may be largely obviated, however, by using an excess of aryliodine dichloride thereby introducing a plurality of chlorine atoms including the substitution of the hydrogen atom alpha to the keto group. The vicinal chlorine atoms can then be removed by treatment with sodium iodide and the unsaturated linkages regenerated. The modification necessary when double bonds are present does not apply to steroids containing aromatic rings, as in the estrogens, because aromatic double bonds are not affected by aryliodine dichlorides.

The invention is particularly adapted to the chlorination in the 21-position of 17-hydroxy-20-keto-steroids unsubstituted in the 21-position. This reaction can be carried out in nearly quantitative yield by mixing the keto-steroid dissolved in an inert solvent with a slight excess (about 10%) of aryliodine dichloride at room temperature, without affecting more hindered points of attack, as for example the 12-position when an 11-keto group is present.

The nature of the aryl group in the aryliodine dichloride is not critical, but for reasons of convenience monocyclic aryliodine dichlorides are preferred. Exemplary of the monocyclic aryliodine dichlorides which can be used in my process are phenyliodine dichloride, p-tolyliodine dichloride, o-tolyliodine dichloride, p-methoxyphenyliodine dichloride, p-nitrophenyliodine dichloride and the like. The physical and chemical properties of the aryliodine dichlorides are described in Willgerodt's Die Organische Verbindungen mit Mehrwertigem Jod (Stuttgart 1914), and in W. J. Hinkinbottom's Reactions of Organic Compounds, p. 419 (2nd edition). Phenyliodine dichloride (iodobenzene dichloride) can be prepared as described in Organic Syntheses 22, 69–70, and other aryliodine dichlorides can be prepared by analogous processes.

The inert solvent used in the process of the invention is one which does not itself react readily with the steroid or the aryliodine dichloride. Suitable solvents which are inert to halogenation are well-known in the art. The purpose of the inert solvent is to dissolve the steroid so that the latter can react readily with the chlorinating agent. Hydrocarbons, halohydrocarbons and lower fatty acids are exemplary as acceptable inert solvents provided the steroid is at least partially soluble therein under the conditions employed for the chlorination. Lower aliphatic alcohols and ketones should be avoided since they react with the aryliodine dichloride.

The following examples will further illustrate the invention.

Example 1

A solution of 10 g. of pregnane-3α,17α-diol-11,20-dione in 140 ml. of analytic reagent chloroform was placed in a 250 ml. round bottomed flask equipped with a stirrer and drying tube. Phenyliodine dichloride (8.7 g.) was then added, and the mixture was stirred for two hours. The resulting faint orange-pink solution was extracted successively with 200 ml. of water, 200 ml. of saturated sodium bicarbonate solution and 200 ml. of 5% sodium chloride solution. The aqueous washings were extracted with chloroform and the total chloroform solution was concentrated. The residue was stirred with 25 ml. of ether, and the resulting crystalline product was collected by filtration, washed with ether and petroleum ether (Skellysolve B) and dried at 50° C., giving 9.7 g. of 21-chloropregnane-3α,17α-diol-11,20-dione, M. P. 186–187° C.

Anal. Calcd. for $C_{21}H_{31}O_4Cl$: Cl, 9.27. Found: Cl, 9.12.

Example 2

A mixture of 100 g. of pregnane-3α,17α-diol-11,20-dione, 87 g. of phenyliodine dichloride and 2500 ml. of alcohol-free chloroform was stirred for one and one-half hours, and the resulting product was worked up as described in Example 1. There was obtained 101 g. (92%) of 21-chloropregnane-3α,17α-diol-11,20-dione, M. P. 184–185° C., containing 9.24% chlorine.

Example 3

A mixture of 60 g. of pregnane-3α,17α-diol-11,20-dione, 52.2 g. of phenyliodine dichloride and 1680 ml. of alcohol-free chloroform was stirred for two hours, and the product was worked up as described in Example 1. There was obtained 65.2 g. (98.8%) of 21-chloropregnane-3α,17α-diol-11,20-dione, M. P. 184–185° C., containing 9.16% chlorine.

Example 4

A mixture of 2.02 g. of 21-acetoxypregnan-17α-ol-3,11,20-trione, 1.38 g. of phenyliodine dichloride and 60 ml. of acetic acid was stirred for one and one-half hours. Water (60 ml.) was then added, and the resulting precipitate was collected by filtration and dried giving 1.57 g. of 4-chloro-21-acetoxypregnan-17α-ol-3,11,20-trione. When recrystallized from acetone a sample melting at 237–239° C. was obtained.

Example 5

By the methods described in Examples 1–4, androstan-3-ol-17-one reacts with phenyliodine dichloride to give 16-chloroandrostan-3-ol-17-one.

Example 6

By the methods described in Examples 1–4, pregnan-17α-ol-3,11,20-trione reacts with two equivalents of phenyliodine dichloride to give 4,21-dichloropregnan-17α-ol-3,11,20-trione.

Example 7

Phenyliodine dichloride (17.55 g., 0.064 m.) was added to a solution of 16.69 g. (0.02 m.) of pregnane-3α,12α-diol-20-one in 50 ml. of chloroform. The temperature of the mixture rose to 34° C. after addition of the phenyliodine dichloride. The mixture was then cooled to 22° C., stirred for one and one-half hours and kept at room temperature for about fifteen hours. The resulting solution was concentrated until all of the chloroform was removed. The residue was stirred with 20 cc. of ether, and the crystalline product was collected by filtration giving 2.4 g. of 17,21-dichloropregnane-3α,12α-diol-20-one, M. P. 205–206° C. Recrystallization several times from methanol gave a sample melting at 218.5–219° C.

Anal. Calcd. for $C_{21}H_{32}O_3Cl_2$: Cl, 17.58. Found: Cl, 17.42.

I claim:

1. The process for replacing with chlorine a hydrogen atom attached to a carbon atom alpha to a keto group in a keto-steroid which comprises treating said keto-steroid in an inert organic solvent with at least one equivalent of an aryliodine dichloride.

2. The process for chlorinating in the 21-position a 17-hydroxy-20-keto-steroid unsubstituted in the 21-position which comprises treating said steroid in an inert organic solvent with at least one equivalent of an aryliodine dichloride.

3. The process for replacing with chlorine a hydrogen atom attached to a carbon atom alpha to a keto group in a keto-steroid which comprises treating said keto-steroid in an inert organic solvent with at least one equivalent of phenyliodine dichloride.

4. The process for chlorinating in the 21-position a 17-hydroxy-20-keto-steroid unsubstituted in the 21-position which comprises treating said steroid in an inert organic solvent with at least one equivalent of phenyliodine dichloride.

5. The process for chlorinating pregnane-3α,17α-diol-11,20-dione in the 21-position which comprises treating said steroid in an inert organic solvent with at least one equivalent of phenyliodine dichloride.

6. The process for chlorinating pregnane-3α,17α-diol-11,20-dione in the 21-position which comprises treating said steroid in chloroform with at least one equivalent of phenyliodine dichloride.

References Cited in the file of this patent

UNITED STATES PATENTS

| Number | Name | Date |
| --- | --- | --- |
| 2,369,065 | Marker | Feb. 6, 1945 |
| 2,403,683 | Reichstein | July 9, 1946 |
| 2,447,325 | Gallagher | Aug. 17, 1948 |

OTHER REFERENCES

Garvey et al.: Jour. Am. Chem. Soc. 59, 1827–1829 (1937).